UNITED STATES PATENT OFFICE.

SIGISMUND E. SIMON, OF BELLEVILLE, NEW JERSEY.

BROWN ANTHRACENE DYE AND METHOD OF MAKING SAME.

SPECIFICATION forming part of Letters Patent No. 686,356, dated November 12, 1901.

Application filed February 25, 1898. Serial No. 671,652. (Specimens.)

*To all whom it may concern:*

Be it known that I, SIGISMUND E. SIMON, a citizen of the United States, and a resident of Belleville, in the county of Essex and State of New Jersey, have invented a new and Improved Process of Producing a Fast-Brown Anthracene Dye and the Dye Produced by Said Process, of which the following is a specification.

This invention consists in a new and useful process of producing a fast-brown anthracene dye, valuable especially for dyeing chrome-mordanted fiber.

It also consists of the dye body itself existing as a composition of matter.

The new dye body is tri-oxy-anthraquinone of the structure

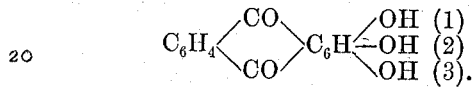

In carrying out the process I may start with di-nitro-oxy-anthraquinone of the structure

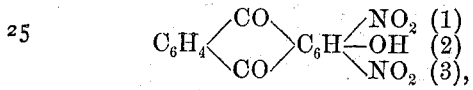

or I may start with meta-oxy-anthraquinone. If the latter is the starting body, I transform it into the di-nitro-oxy-anthraquinone, as by treatment with nitric acid or nitrous acid. In further carrying out the process the di-nitro-oxy-anthraquinone is treated with a suitable reducing agent adapted to reduce the nitro groups without affecting the carbonyl group or groups. Various reducing agents may be employed, and the one selected will determine the character of the steps that may be required to transform the di-nitro-oxy-anthraquinone into the tri-oxy-anthraquinone desired. For example, I may use as the reducing agent protoxid of iron in alkaline solution, or protochlorid of tin in acid solution, or protochlorid of tin in alkaline solution, or tin in acid solution. If protoxid of iron in alkaline solution is used as the reducing agent, the process may be so conducted that the di-nitro-oxy-anthraquinone will be transformed at one step into the desired tri-oxy-anthraquinone. If protochlorid of tin in acid or alkaline solution is used as the reducing agent, the di-nitro-oxy-anthraquinone is transformed into di-amido-oxy-anthraquinone of the structure

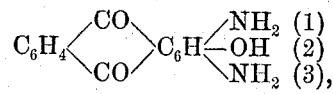

which is then treated with nitrous acid to form di-diazo-oxy-anthraquinone of the structure

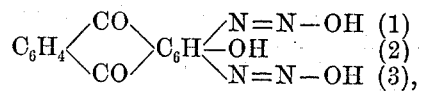

which in turn is then boiled in water, generally acidulated. By this boiling in water the diazo groups are replaced by the hydroxyl groups, and the tri-oxy-anthraquinone desired is produced. Instead of transforming the di-amido-oxy-anthraquinone into the di-diazo-oxy-anthraquinone by treatment with nitrous acid it may be transformed into the tri-oxy-anthraquinone desired by subjecting it to the action of an acid—for example, hydrochloric acid—under pressure till the amido groups are replaced by the hydroxyl groups.

The reactions above stated in transforming the di-nitro-oxy-anthraquinone into the tri-oxy-anthraquinone will serve to indicate practical methods of reaching the desired result and are to be understood as only examples of various methods which might be employed without departing from the scope of my invention. Moreover, it is to be understood that my invention is not to be limited to the employment of the reducing agents particularly specified, as other suitable reducing agents may be employed which will reduce the nitro groups without affecting the carbonyl group or groups.

The body produced by this process, as above described, is distinguished from other dyestuffs by the following characteristics taken as a whole: It is a reddish-brown flocculent precipitate. If the same is dissolved in alkali, reprecipitated, and then dried, the precipitate assumes a conchoidal structure. Comminuted it forms a dark-brown crystalline powder. It is sparingly soluble in boiling water, imparting a reddish-yellow color to the latter. In cold water it is sparingly soluble. In alcohol it is soluble with reddish-yellow color, sparingly soluble in ether with yellow color, and sparingly soluble in chloroform with greenish-yellow color. In concentrated sulfuric acid the dyestuff dissolves with caramel color and is again precipitated from this solution on addition of water. The dyestuff is readily soluble in ammonia, imparting to the solution a brown color with a cherry-red tinge and soluble in similar manner in caustic-soda solution. On heating the dyestuff forms a reddish-yellow sublimate, partially melting and charring. In heating the dyestuff to high temperature the appearances are similar to those described by Seuberlich, (*Berichte*, Vol. X, page 40.) Anthragallol, as described by Seuberlich, presents some of the characteristics above mentioned; but anthragallol differs from my product and may be readily distinguished from it by certain characteristics which are peculiar to each body. For example, my body when dissolved in ammonia imparts to the solution a brown color with a cherry-red tinge, whereas under similar conditions anthragallol imparts to the solution a greenish color turning blue. (See Seuberlich.) Anthragallol, as differentiated from the product of the present invention, is not herein claimed.

What I claim, and desire to secure by Letters Patent, is—

1. The process of producing a fast-brown dye which consists in treating di-nitro-oxy-anthraquinone of the structure

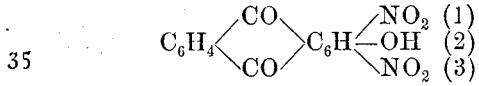

in a suitable manner and thereby transforming it into tri-oxy-anthraquinone of the structure

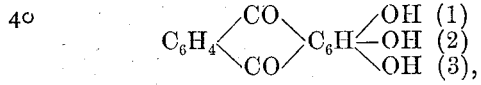

such treatment including a treatment of the di-nitro-oxy-anthraquinone with a suitable agent which will reduce the nitro groups without affecting the carbonyl group or groups.

2. The process of producing a fast-brown dye which consists in treating di-nitro-oxy-anthraquinone of the structure

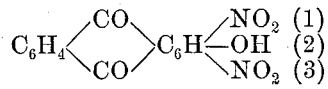

in a suitable manner and thereby transforming it into tri-oxy-anthraquinone of the structure

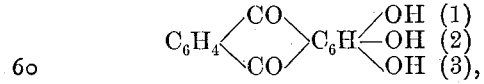

such treatment including a treatment of the di-nitro-oxy-anthraquinone with a suitable agent which will reduce the nitro groups without affecting the carbonyl group or groups and thereby transform such di-nitro-oxy-anthraquinone into di-amido-oxy-anthraquinone of the structure

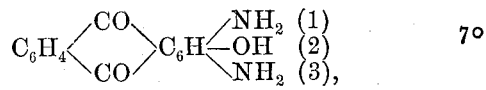

and such treatment also including a subsequent treatment of the di-amido-oxy-anthraquinone in a suitable manner to produce the desired tri-oxy-anthraquinone.

3. The process of producing a fast-brown dye which consists in treating di-nitro-oxy-anthraquinone of the structure

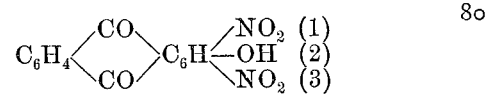

in a suitable manner and thereby transforming it into tri-oxy-anthraquinone of the structure

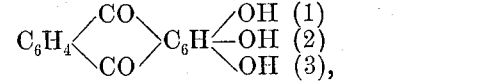

such treatment including a treatment of the di-nitro-oxy-anthraquinone with a suitable agent which will reduce the nitro groups without affecting the carbonyl group or groups and thereby transform such di-nitro-oxy-anthraquinone into di-amido-oxy-anthraquinone of the structure

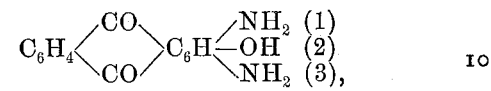

and such treatment also including a subsequent treatment of the di-amido-oxy-anthraquinone, whereby it is transformed into di-diazo-oxy-anthraquinone, and also including a further treatment of the di-diazo-oxy-anthraquinone in a suitable manner to produce the desired tri-oxy-anthraquinone.

4. A fast-brown dye produced substantially as described from an anthracene derivative and having the structure

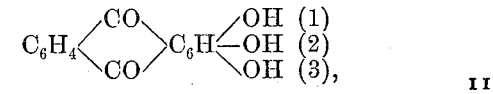

said body having the distinguishing characteristic that it is readily soluble in both ammonia and alkali caustic solution, imparting to such solutions a brown color with a cherry-red tinge.

In testimony whereof I have signed my name to this specification in the presence of two subscribing witnesses.

S. E. SIMON.

Witnesses:
NICHOLAS M. GOODLETT, Jr.,
EDWIN SEGER.